March 6, 1928.　　　　　C. GITTERY, JR　　　　　1,661,798

FRONT LICENSE PLATE LIGHT

Filed Nov. 13, 1925

INVENTOR.
CHARLES GITTERY JR.
BY
ATTORNEY.

Patented Mar. 6, 1928.

1,661,798

UNITED STATES PATENT OFFICE.

CHARLES GITTERY, JR., OF DETROIT, MICHIGAN.

FRONT-LICENSE-PLATE LIGHT.

Application filed November 13, 1925. Serial No. 68,779.

My invention relates to a new and useful improvement in a front license plate light, and has for its object the provision of means for illuminating the front license plate, conventionally used with automobiles and the like.

Another object of the invention is the provision of a wiring system connecting the license plate lights, the head lights, and the tail lights of the vehicle.

Another object of the invention is the provision of a novel housing for containing the license plate lights.

Other objects will appear hereinafter.

The invention consists in the combination and arrangement of parts hereinafter described and claimed.

The invention will be best understood from a reference to the accompanying drawings, which form a part of this specification and in which, Figure 1 is a front elevational view of the invention.

Figure 1:
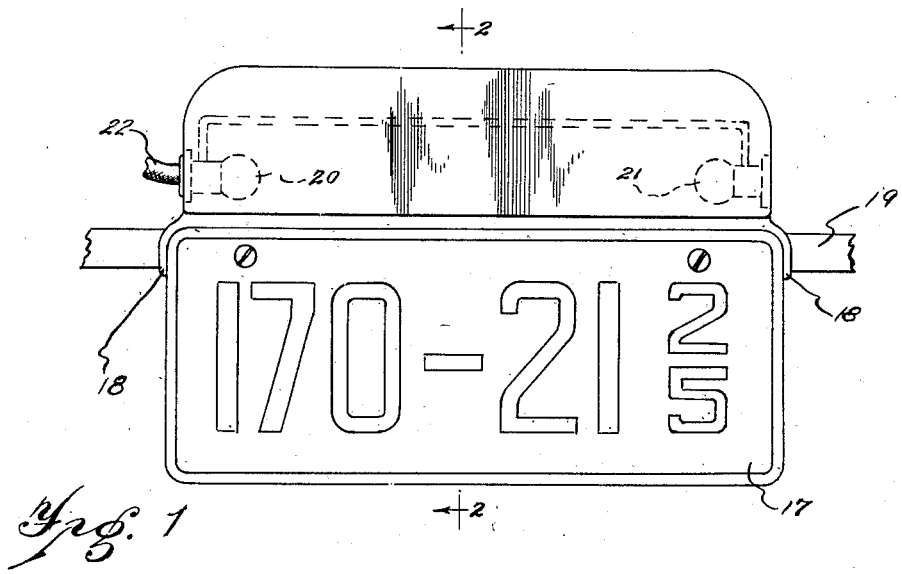
Figures 2, 3:
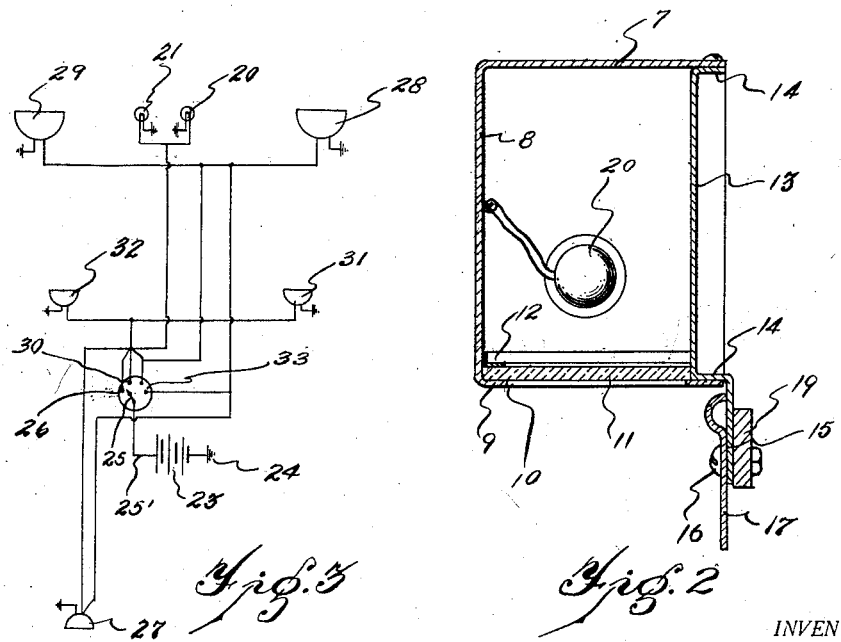
Figure 2 is a sectional view taken on substantially line 2—2 of Figure 1.
Figure 3 is a diagrammatic view illustrating the wiring used in the invention.

As shown in the drawings the invention comprises a housing having a top wall 7, a front wall 8, and a bottom wall 9 formed from a single sheet of material. Formed in the bottom wall 9 is an elongated opening 10 over which is positioned a transparent closure 11 held in position by a frame 12 formed from angle iron or the like. The rear wall 13 is angularly turned at its edges to provide flanges 14 and is provided with a tongue 15 depending therefrom.

Mounted upon the tongue 15 by bolts 16 is the license plate 17, upon which the number and other indicating media are formed.

As shown in Figure 1 the depending tongue 15 is flared outwardly at its ends 18 and 18'. The bolts 16 pass through the tongue 15 and through a supporting surface 19 which is mounted upon the vehicle.

Mounted upon each of the side walls of the housing are light bulbs 20 and 21 suitably connected by the wiring 22 to a source of electrical energy—the light bulbs being grounded through the vehicle.

The construction is such that when the light bulbs 20 and 21 are lit the light will be projected through the transparent closure 11 so as to illuminate the license plate 17. The provision of the flared ends 18 and 18' of the tongue 15 permits the housing proper to be disposed centrally over the license plate 17 within its marginal limit, while at the same time affording a secure surface for engaging the license plate 17 throughout its length,—thus the light is centered over the numbered portion of the license plate, and a more efficient illuminating of the license plate is effected.

It will be noted that no light is visible from the front of the housing, the front wall being entirely closed.

By having the lights 20 and 21 of sufficient power so as to brightly illuminate the license plate, the license plate will thereby be visible to one approaching the vehicle even when the head lights of the vehicle are turned on, the more prominently illuminated object standing out.

The arrangement of the rear wall is such so as to provide a firm and secure mounting on the housing proper and at the same time permit of economical structure of the invention.

As shown in the diagrammatic view a battery 23 may be utilized as the source of power and suitably grounded as at 24. This battery is controlled by a switch arm 25 suitably connected by the wire 25' to one pole of the battery. The switch arm may be rocked to engage the contact 26, thus closing the circuit to the license plate lights 20 and 21 and to the tail light 27 and the head lights 28 and 29. When moved to engage the contact 30 the circuit to the dim lights 31 and 32 is also closed. When moved to the contact 33 the lights 28 and 29 are lighted as is the tail light 27. This combination of wiring is believed to be most efficient as it accommodates itself to the various arrangements required.

While I have illustrated and described the preferred form of construction I do not wish to limit myself to the precise details of structure shown but desire to avail myself of such variations and modifications as come within the scope of the appended claims.

Having described my invention what I claim as new and desire to secure by Letters Patent is:

1. A device of the class described comprising a housing having top, front and bottom walls formed integral with each other and side walls, said bottom wall having an elongated opening formed therein; a transparent closure mounted in said housing over said opening; an illuminating means mounted in said housing adapted for projecting rays of light through said closure, a rear wall for said housing, said rear wall engaging between said top and bottom walls and provided at its edges with laterally turned outwardly directed flanges, said flanges lying in engagement with the inner surface of all of the walls of said housing, the lowermost of said flanges extending outwardly beyond the edge of said bottom wall and having a portion extending downwardly below the bottom wall, said downwardly projecting portion being flared outwardly at opposite ends beyond the end of said housing, and a license plate mounted on said downwardly projecting portion.

2. A front license plate light and holder comprising a housing having a top wall, front wall, bottom wall and side walls, said bottom wall having an elongated opening formed therein; a transparent closure mounted in said housing over said opening; a pair of lights each mounted on the side wall of said housing adapted for projecting light downwardly through said transparent closure; a rear wall engaging between said top and bottom walls and provided at its edges with laterally outwardly directed flanges, said flanges lying in engagement with the inner surface of all of the walls of said housing, the lowermost of said flanges being provided with a tongue projecting downwardly below said bottom wall, said tongue being flared outwardly at opposite ends beyond the side wall of said housing; and a license plate mounted on said tongue, said housing being positioned above and within the marginal limits of said license plate.

In testimony whereof, I have signed the foregoing.

CHARLES GITTERY, Jr.